US006129975A

United States Patent [19]

Curiel

[11] Patent Number: 6,129,975

[45] Date of Patent: Oct. 10, 2000

[54] TAMPER RESISTANT VEHICULAR VALIDATION TAB AND ASSOCIATED METHOD

[75] Inventor: Yoram Curiel, Aurora, Colo.

[73] Assignee: Optical Security Group, Inc., Denver, Colo.

[21] Appl. No.: 08/854,717

[22] Filed: May 12, 1997

Related U.S. Application Data

[63] Continuation-in-part of application No. 08/652,026, May 21, 1996, Pat. No. 5,948,555.

[51] Int. Cl.[7] .......... B32B 3/00

[52] U.S. Cl. .......... 428/195; 156/223; 156/220

[58] Field of Search .......... 156/223, 303.1, 156/67, 63, 219, 220; 428/40, 43, 42.1, 42.2, 42.3, 46, 41.8, 195

[56] References Cited

U.S. PATENT DOCUMENTS

| | | |
|---|---|---|
| 3,864,855 | 2/1975 | Pekko et al. . |
| 3,895,987 | 7/1975 | Loreck . |
| 4,695,077 | 9/1987 | Pretre . |
| 5,151,572 | 9/1992 | Jack . |

*Primary Examiner*—Merrick Dixon
*Attorney, Agent, or Firm*—Arnold B. Silverman; Eckert Seamans Cherin & Mellott, LLC

[57] ABSTRACT

A vehicular validation tab has an outer film provided with an outer surface and an inner surface. Adhesive enhancing tie coat means are secured to the inner surface in some, but not all portions thereof. A layer of adhesive is secured to an inner surface of the outer film with identifying information interposed therebetween. A strippable film may be secured over the adhesive which may be pressure-sensitive adhesive and a write-resistant material may be secured to the outer surface of the outer film. Portions of the inner surface of the outer film not having the tie coat are provided with a release material to provide for differential bonding of the identifying information. The tie coat and release coat portions facilitate destruction of portions of the identifying material when the outer film is separated from the adhesive. The bond between the outer film tie coat portions and the adhesive is stronger than the bond between the adhesive and the license plate or other substrate, and the bond between the release coat portions and the adhesive is less than the bond between the adhesive and the license plate or other substrate. As a result, an effort to remove the vehicular validation tab will result in fracturing of the identifying material. The outer film is preferably transparent to facilitate viewing of the identifying material. The adhesive layer is also preferably transparent. In another embodiment the tab is securable to the inside of the window by an adhesive upper layer so as to be viewable therethrough.

22 Claims, 4 Drawing Sheets

TAMPER RESISTANT VEHICULAR VALIDATION TAB AND ASSOCIATED METHOD

CROSS REFERENCE TO RELATED APPLICATION

This application is a continuation-in-part of U.S. Ser. No. 08/652,026 filed on May 21, 1996, U.S. Pat. No. 5,948,555

BACKGROUND OF THE INVENTION

1. Field of the Invention

The present invention relates to an improved tamper resistant vehicular validation tab of the type that is secured within recessed corners of the exposed surface of vehicular license plates, or to bumpers, or other parts of the vehicle, such as windows so as to provide confirmation of the identity of the vehicle and, where desired, the date of expiration of the registration or other information and an associated method and, more specifically, the invention is directed toward a system which eliminates a number of the undesirable characteristics of prior art systems.

2. Description of the Prior Art

It has long been known for governmental units to license vehicles, such as automobiles and trucks and, as part of the system, to provide metal license plates, each of which have a unique alphanumeric designation so as to identify the owner and vehicle which has been registered with the governmental unit. As the period for which a vehicle license fee has been paid is generally one or two years, were a new metal license plate issued at expiration, the cost would be substantial. As a result, it has been conventional practice to use the metal license plate for a period of years, which may be on the order of 6 to 15 years, but to provide a small recess of approximately 1 inch by 1½ inch size, for example, in each corner of the license plate and to provide annual validation tabs which are adhesively secured within one of these corners.

It has also been known to apply identification or parking validation labels to bumpers or windows and state inspection tabs to the interior of vehicle windows.

U.S. Pat. Nos. 5,370,763 and 5,595,624 disclose an informational article which may be a vehicle temporary registration. These patents disclose insertion of variable information over a patterned image which may be a hologram to resist photocopying and securing a transparent tape which has write-resistant properties thereover.

In general, the existing prior art tabs provide a fully fabricated unitary material containing glass beads embedded within a composite element segregated from the adhesive by a base film. The adhesive layer secures the tab to the license plate recess and the identifying dating information, such as the year date and the registration number provided on the exposed surface of the plate. When the current tab is removed, there may be some tear across all the layers, but there is no substantial destruction of the identifying information. This provides opportunities for theft of the tab and use on the license plate of an unauthorized user, as well as alteration of the identifying information.

There has also been a tendency for users to secure adhesively to a new vehicular validation tab over an old one thereby creating two or more tabs secured within one recess and also thereby contributing to ease of unauthorized removal of the tab. Also, application of heat softens the adhesive and permits undesired removal of the tab as a unit.

The reason for employing the glass beads in the prior art is that when exposed to light, particularly at night, the beads will reflect the light, thereby confirming that a tab is present on the vehicle. The retro-reflective concept normally involves providing a metallized backing on the tab so as to enhance the efficiency with which light impinged on the tab will be reflected back toward the direction of impingement. From an environmental standpoint, the glass bead tab cannot be recycled in any practical way.

Many motor vehicle administrators believe that the current tab does not protect the variable data, is easy to remove from a vehicle by the professional thief, is very hard to apply and secure by an ordinary citizen and, in general, other than providing some safety by reflecting at night, is worthless. Similar problems exist with respect to window tabs, such as inspection stickers secured to the window interior. There remains, therefore, a substantial need for an improved vehicular validation tab which will facilitate avoidance of the foregoing problems.

SUMMARY OF THE INVENTION

The present invention has provided an improved vehicular validation or registration tab which eliminates a number of the problems of the currently employed prior art tab systems. One embodiment of the tab of the present invention has an outer film which has an outer surface and an inner surface. Adhesive means has one surface secured to portions, but not all of the inner surface of the outer film. A second surface of the adhesive means is adapted to be adhesively secured to a recess in a license plate or other vehicle part, such as a bumper or window, for example. Identifying means are interposed between the outer film and the adhesive means to thereby encapsulate and protect the valuable information. Efforts to separate the tab from the license plate will result in irreversible separation of portions of the identifying means, but not all of the same, thereby destroying the identifying means and resisting effective theft and reuse of the tab. In one embodiment, a release material may be provided in regions of the inner surface of the outer film to facilitate differential bonding of the adhesive layer to the outer film inner surface. In the regions not covered by release material, a tie coat which enhances adhesive bonding could be provided.

If desired, additional security means, such as by providing a composite outer film consisting of an outer film member and inner resin member secured to the inner surface thereof. An additional diffraction pattern may be formed within the lower portion of the resin layer or the inner surface of the unitary outer film member.

In a preferred embodiment, the upper surface of the outer film has a write-resistant surface so as to resist efforts to write or print on the surface. In addition, the lower surface of the adhesive layer, which is to be secured to a license plate, preferably is a pressure-sensitive adhesive which during storage and handling may be covered by a strippable release material. The adhesive bond between the adhesive means and the outer film in the portions coated with the tie coat or other adhesive enhancing means is preferably greater than the adhesive bond between the adhesive means and the license plate. The adhesive bond between the outer film in the portions coated with the release material has a weaker bond than both (a) the tie coat/adhesive means bond and (b) the adhesive means/license plate bond. As a result, efforts to remove the tab will first cause separation of the tie coat portions containing part of the identifying means from the adhesive means and retention of the same on the outer film. The release coated portions of the identifying means will be secured to the adhesive means upper surface to thereby effect destruction of the identifying means within these portions. Continued application of force causes separation of the tab from the license plate or other substrate, thereby providing clean removal of the tab as a unit, but not without destruction or substantial alteration of the identifying means. In one embodiment, the release material coated portions will be elongated slightly as the adhesive stretches under the influence of the tab removing force, thereby distorting portions of the identifying means.

It is also preferred that both the outer film and the adhesive means be substantially transparent to thereby reduce the likelihood of people stacking a series of tabs on top of each other. This approach also takes advantage of the reflective properties of the underlying portion of the license plate.

An associated method involves providing an outer film having an inner surface, providing the inner surface with portions coated with adhesive enhancing means and other portions coated with release means and interposed between the coated lower surface and the adhesive means.

In an embodiment adapted to be secured to the inside of a vehicle window and viewed therethrough from the exterior of the vehicle, a pressure sensitive adhesive having an overlying strippable film may be provided in the upper part of the assembly overlying a layer having identifying means secured to the undersurface thereof with a hologram underlying the identifying means. A patterned layer of tie coat and release means are secured thereunder with a film or paper web secured to the underside thereof.

It is an object of the present invention to provide an improved tamper resistant vehicular validation tab wherein efforts to remove the tab from a license plate will result in fracturing portions of the identifying material layered within the composite structure.

It is a further object of the present invention to provide a vehicular validation tab and an associated method which provides enhanced security against theft.

It is a further object of the present invention to provide such a vehicular validation tab system which employs differential adhesive properties in regions of the assembly adjacent to the identifying means to fracture the identifying means in the event of an effort to remove the tab from the license plate or other substrate.

It is a further object of the invention to provide a structure having an outer film which is flexible and will have portions having good bond with underlying adhesive means.

It is a further object of the invention to have identifying means placed on the underside of the outer film before the adhesive means is secured to the lower surface of the outer film to thereby embed the identifying means within the tab and resist undesired alteration of the identifying means.

It is a further object of the invention to provide additional security means, such as diffraction patterns which may be molded or stamped within such an assembly.

It is a further object of the present invention to provide a vehicle validation tab which has the identifying means embedded therewithin, but is so structured as to render the identifying information readily visible.

It is a further object of the invention to provide such a tab which resists tab removal without damage to the identifying or validating information, while permitting complete removal of the tab from a substrate, such as a vehicle license plate, bumper, or window.

It is another object of the present invention to provide a tab securable to the inside of a vehicle window so as to be viewable therethrough.

It is a further object of the present invention to provide such a system without requiring the use of tabs having glass beads.

It is a further object of the present invention to achieve these objectives by employing a plurality of levels of relative adhesive bonding strength to permit clean removal of the tab from a substrate only with irreversible damage to the identifying means.

These and other objects of the invention will be more fully understood from the following description of the invention on reference to the illustrations appended hereto.

DESCRIPTION OF THE PREFERRED EMBODIMENT

As used herein, the term "vehicular validation tab" will refer to tabs, decals, stickers and the like issued by or approved by governmental units to be secured to a portion of a vehicle, such as a license plate, a bumper, window, or other designated area, so as to provide an indication that the registration fee for the vehicle has been paid the registration fee for a particular period. It will also embrace vehicle identification for nongovernmental purposes, such as parking lot or garage validation, or corporate identification of vehicles, for example. In addition to land vehicles, this designation includes boats and planes.

As used herein, the term "identifying means" shall refer to information contained on a vehicular validation tab indicating either a year, month, day or other time reference and/or providing a registration number or equivalent and/or identification of a governmental unit, business entity or other authorizing source.

As employed herein, the terms "vehicle" or "vehicular" shall include but not be limited to automobiles, vans, trucks, golf carts, motorcycles, motor scooters, boats, planes and railroad cars.

Figure 1:
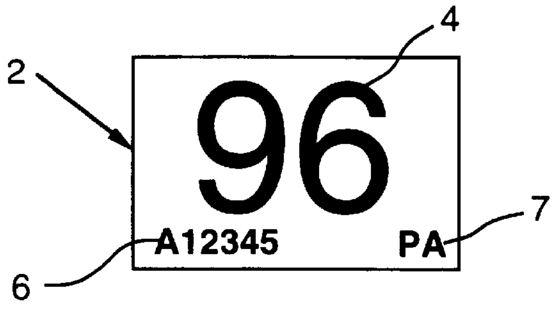
FIG. 1 is a schematic illustration of a type of vehicular validation tab.

FIG. 1 shows schematically a vehicular validation tab 2 which displays a year date 4, an alphanumeric designation 6 keyed to the particular vehicle, and a state abbreviation 7.

Figure 2:
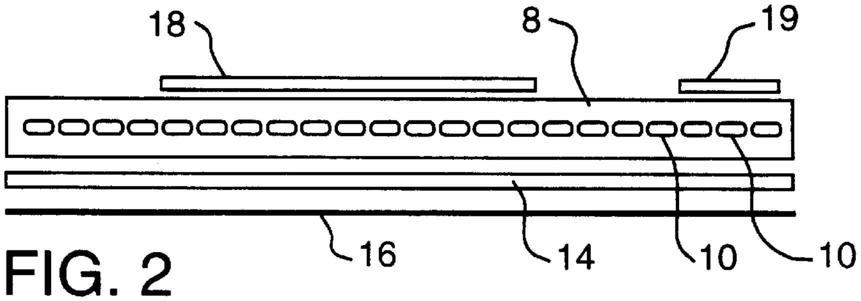
FIG. 2 is an exploded elevation of a prior art form of vehicular validation tab employing glass beads as a retroreflective material.

FIG. 2 shows an exploded end view of a form a prior art vehicular validation tab which consists of a film member 8 within which are embedded a plurality of glass beads, such as 10, an adhesive layer 14, a removable liner 16 which, when removed, will expose the lower pressure-sensitive adhesive on adhesive layer 14. The identifying means 18,19 are contained on the exposed surface of the glass bead containing film 8.

Figure 3:
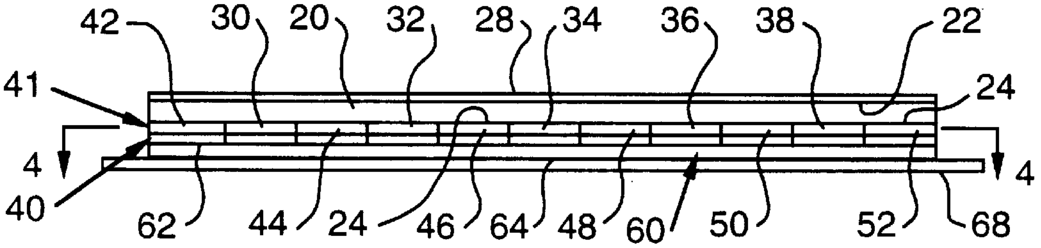
FIG. 3 is an illustration of an end view of one embodiment of a vehicular validation tab of the present invention.

Referring to FIG. 3, a first embodiment of the present invention will be considered. An outer film 20, which is flexible and preferably stretchable, has an upper surface 22 and a lower surface 24. The outer film 20 may be composed of polyvinylchloride or polyesters, for example. The former has great durability in an outdoor environment and the latter has high tear strength. A preferred embodiment has secured to the upper surface a write-resistant layer 28 which may be composed of silicone, polyurethane, or tetrafluoride so as to resist any writing or printing thereon. An adhesive promoting or tie coat layer, which consists of a plurality of discrete portions, such as 30,32,34,36,38, of tie coats which are known to those skilled in the art, facilitate bonding of adhesive thereto. These tie coat portions 30,32,34,36,38 are secured to the lower surface 24 of outer film 20 and also to the identifying means 40. Other portions of the lower surface 20 are secured to release means 42,44,46,48,50,52, such as silicone, polyurethane or polytetrafluoroethylene. The identifying means 40 will be affixed to the lower surface of layer 41 which contains the tie coat 30,32,34,36,38 and release means 42,44,46,48,50,52 as by printed or image transferring, as by hot stamping, or other suitable means of applying the identifying means 40 to the undersurface of the outer film 20 under the layer containing the tie coat or other adhesive enhancing means 32,34,36,38 and release means 42,44,46,48,50,52. For convenience of reference herein, such identifying means 40 secured to the lower surface of coated outer film 20 will be referred to as "printing." It will be preferred to have the tie coats 30,32,34,36,38 and release coats 42,44,48,50,52 present in different portions, which in the aggregate, cover the entire lower surface 24 and preferably are in portions which alternate and subdivide the lower surface 24. It is also preferred that these tie coat portions 30,32,34,36,38 and release means portions 42,44, 46,48,50 be present at least over a major portion of the identifying means 40. In either event, it will be appreciated that only portions of the identifying means 40 will be adhesively secured to the outer film 20, i.e., those parts within the tie coat. Adhesive means 60 has its upper surface 62 secured to the portions of identifying means 40 where the tie coat exists. Adhesive means 60 has a lower surface 64 which is adapted to be secured in intimate surface-to-surface contact with a license plate recess or other substrate. In a preferred embodiment of the invention, identifying means 40 will be printed on the undersurface of the tie coat and release layer 41. Efforts to raise outer film 20 will result in tie coated portions 32–38 remaining within and becoming structurally part of the outer film 20 and the release coated portions 42–52 being secured to the upper surface of adhesive means 60. In a preferred embodiment, an acrylic adhesive with an extended elastic characteristic will be employed as adhesive means 60. This will cause the identifying means 40 to be torn away from the release coated areas first. After this, the lower surface 64 of the adhesive means will separate from the surface it has been secured to, such as a license plate. The end result is a clean metal surface with no traces of adhesive contaminating the top surface of the license plate or other substrate. In the form shown, a removable strip or liner 68 is secured to the lower surface 64 of adhesive means 60 so as to facilitate avoidance of an inadvertent sticking of the tab prior to securement in the desired position. Also, stretching of the outer film 20 will irreversibly alter the identifying means 40.

It will be appreciated that in one practice of the invention, the adhesive bond between the adhesive means 60 and the license plate will be weaker than the adhesive means 60 bond with the tie coated portions, such as 30–38 (even numbers only) and stronger than the adhesive bond between adhesive means 60 and release coat sections (42–52). An effort to remove the tab from the license plate will result in tearing of the identifying means 40 with retention of portions which are printed on the tie coat portions 32–38 of outer film 20 being retained thereon and portions which are printed on the release coat sections 42–52 (even numbers only) being separated from the outer film 20 and retained on adhesive means 60.

Figure 4:
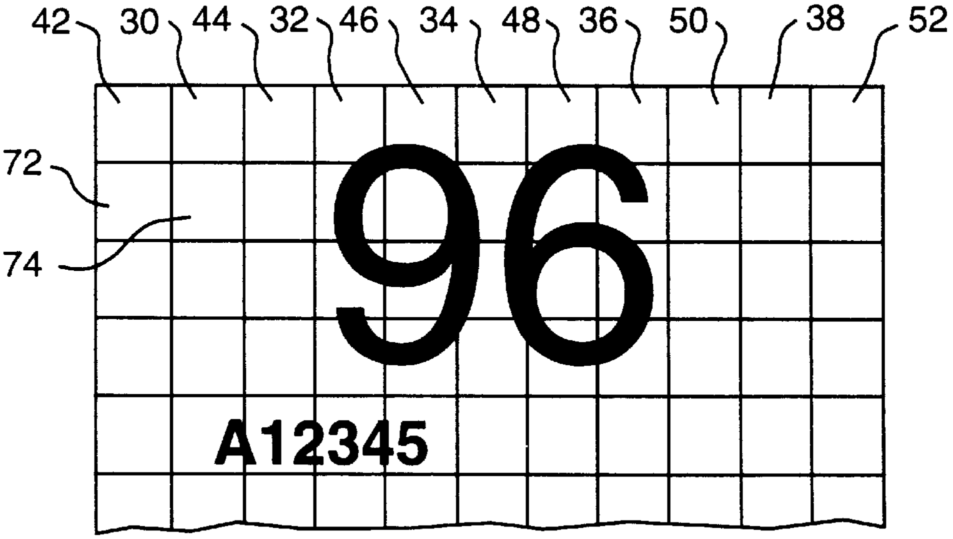
FIG. 4 is a partial view of the release and tie portions overlying the adhesive layer employable with the present invention taken through 4—4 of FIG. 3.

Referring to FIG. 4, there is shown schematically a form of apportionment of the tie coat, which enhances the bond between the outer film 20 and the adhesive means 60, such as 30–38 and release means, such as 42–52 as viewed from above. While this embodiment involves a checkerboard pattern, numerous other patterns providing a plurality of readily bonded zones and release zones will be apparent to those skilled in the art. It is preferred that the size of release portions 42–52 be sufficient so as to facilitate visually perceptible (to the naked eye) distortion of the parts of the identifying means 40 disposed on the release portions 42–52 responsive to stretching of the portions of the upper part of adhesive means 60. It will generally be preferable to have substantially the entire identifying means 40 secured to the tie coat/release material layer 41.

In the form shown in FIG. 4, the labeled row of alternating blocks alternate between release coatings 42–52 and adhesive enhancing coatings 30–38. The other illustrated blocks and those not illustrated may be similarly alternated with, for example, block 72 being an adhesive block and block 74 being a release block. As a result of this pattern, the selected bonding of the identifying means 40 will result in destroying the integrity and appearance of the identifying means 40 and removing portions thereof as a result of any effort to remove the vehicular validation tab.

In a preferred embodiment of the invention, the adhesive enhancing means secured to the outer film 20 will occupy about 30 to 60 percent of the area and about 40 to 70 percent of the area will be occupied by release coating portions. It is preferred to provide the portions of these two materials, so as to enhance the refinement of fracture of the identifying materials responsive to attempts to remove the tab.

Figure 5:
FIG. 5 is an illustration of a form of strippable tab covering the adhesive means of the present invention.

FIG. 5 shows a form of removable liner 68 which, when removed, exposes the lower surface of adhesive means 60 to facilitate securement of the tab to a substrate, such as a license plate, for example. Suitable instructions or other information may be provided on this film 68 as shown. The film 68, as shown in FIG. 3, is larger than the adhesive means 60 in order to facilitate film removal.

Figure 6:
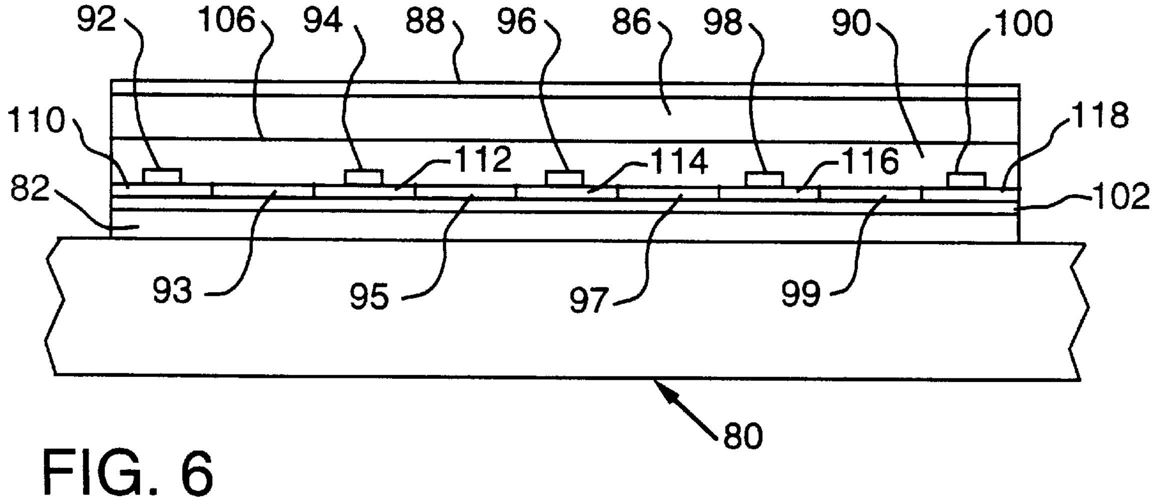
FIG. 6 is a partial view of a vehicular validation tab of the present invention secured to the license plate.

FIG. 6 illustrates an alternate embodiment of the invention which is shown secured to a license plate 80 by adhesive means 82. In this embodiment, an outer film 86 has an overlying write-resistant layer 88 which may be conveniently composed of silicone or tetrafluoroethylene. Underlying and secured to the outer film is a resin layer 90 within which a printed image containing identifying means represented generally by elements 92,94,96,98,100 has been shown. The image may be partially metallized, if desired. Underlying the resin layer 90 is the identifying means 102. Release means 93,95,97,99 and tie coat means 110,112,114, 116,118 are interposed between the resin 90 and identifying means 102. Also, if desired, the hologram may be formed within the lower surface 106 of the upper film 86 and resin layer eliminated. The resin layer may conveniently be made from an acrylic based embossing resin acceptable in the holographic field. This embodiment provides the added security of the hologram 92,94,96,98,100 while preserving the features of prior embodiments.

A suitable adhesive 60,82 may, for example, be a clear acrylic, pressure-sensitive adhesive, such as those marketed under the trade designation FLEXcon V-29 or V-123. The adhesive means 60,82 preferably will elongate under the influence of a force applied to the tab to facilitate distortion of portion of the identifying means.

In a preferred embodiment of the invention, the outer film 20,86 will be substantially transparent so as to permit ready visual inspection of the identifying means 92–100 (even numbers only) as will be the resin layer 90. In addition, it is preferred that the tie coat and release layers also be transparent along with the adhesive means 60,82 in order to minimize the likelihood of stacking of successive tabs. The ability to see through the upper tab will tend to discourage such action as it would interfere with legibility of the identifying means in the outermost tab. Also, this facilitates reflection of light passing through the tab off the retroreflective license plate and back through the tab. If desired, the outer film 20,86, alone or with other portions of the tab, may be made from material containing a dye or tinting material to facilitate identification while preserving transparency.

In general, the resin layer embodiment of FIG. 6 will be preferred where the identifying means will be applied by image transferring, hot stamping, and the embodiment of FIG. 3 will be preferred where the identifying means is applied by other types of printing.

Figure 7:
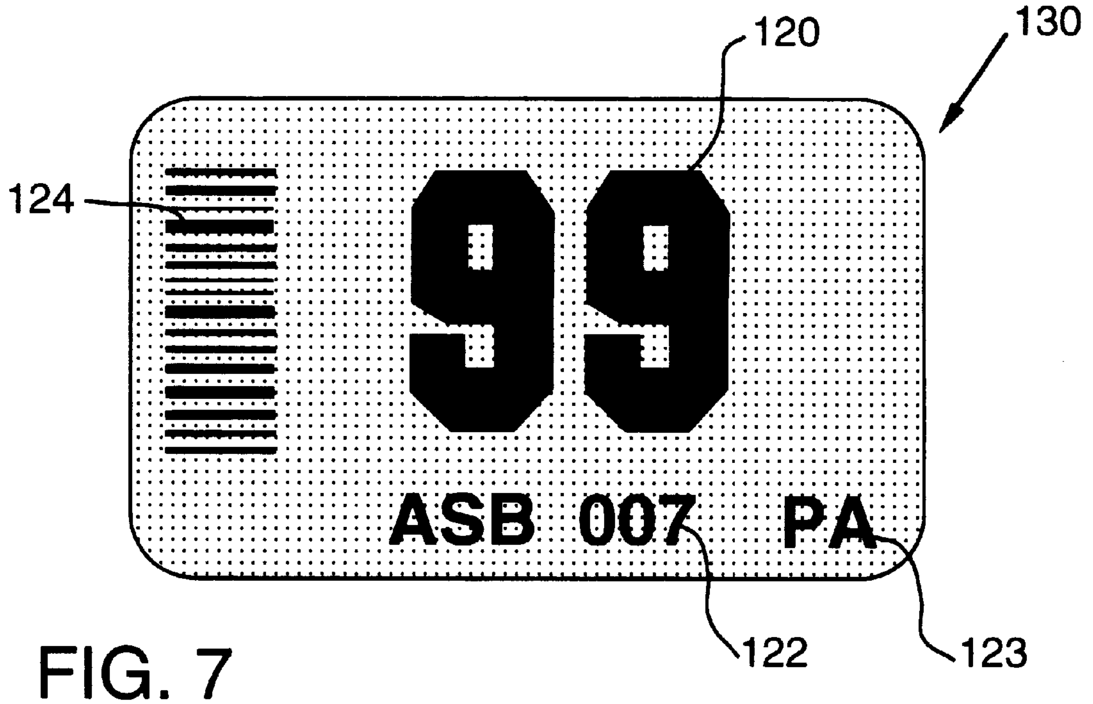
FIGS. 7 and 8 are respectively illustrations of a validation tab in use and after an effort to tamper with the tab as by seeking to remove the same or after normal usage and replacement of a past year with the tab for the next year.

FIG. 7 shows a form of tab of the present invention wherein a year date of expiration, as well as an alphanumeric designation 122, a state abbreviation 123, and a bar code identifier 124 are provided on the tab 130.

Figure 8:
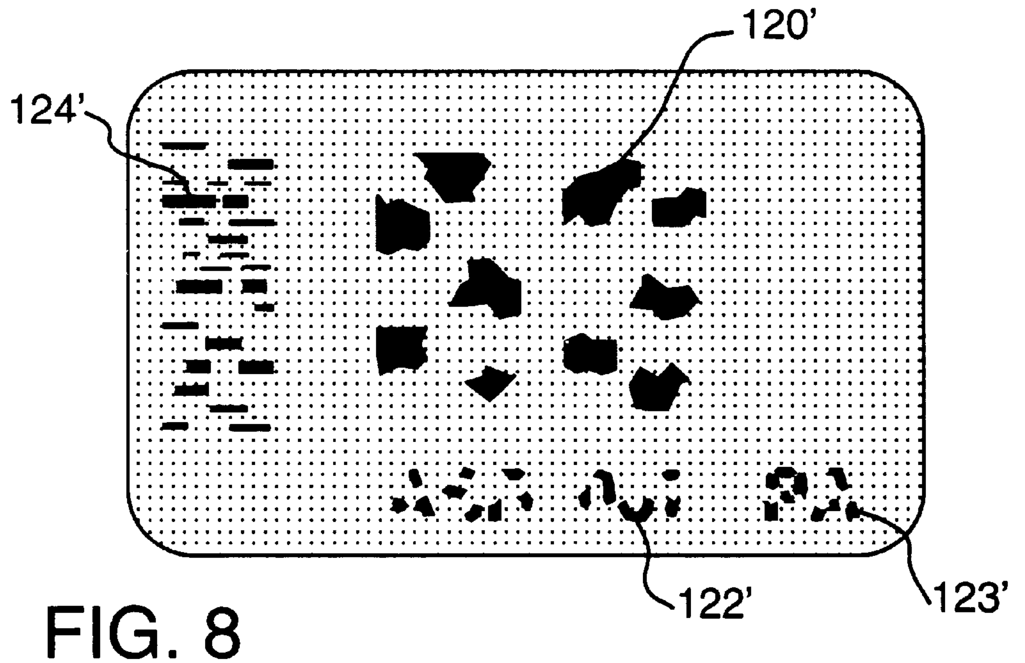

FIG. 8 illustrates the tab of FIG. 7 after an effort to remove the same from a license plate. It will be noted that only portions of the year date 120' remain as is the case with portions 122' of the alphanumeric designation, the state abbreviation 123', and the bar code 124'.

The method of the present invention contemplates providing an outer film having an upper surface and a lower surface and securing tie coat means to portions of the inner surface of the outer film. A release coating is preferably applied to other portions of the lower surface. Adhesive means is secured to the tie coat means with identifying means interposed such that an effort to remove the tab from a substrate will result in irreversible fragmentation and destruction of the identifying means, as shown in the sequence of FIGS. 7 and 8.

The tie coat material serves to both clean and coat the portions of the lower surface to which it is secured and enhance bonding characteristics with adhesive layer 60,82. A suitable tie coat is that sold by FLEXcon under the trade designations 249. If desired, although not preferred, release areas could be provided as disclosed herein while eliminating the tie coat if the outer film will bond adequately to the adhesive 60, 82.

The upper surface of the tab may be provided with a write-resistant material and the undersurface of the adhesive means, which is preferably a pressure-sensitive adhesive, may be provided with a readily removable strip to expose the pressure-sensitive adhesive. If desired, all or portions of the tab may be clear and transparent, or tinted and transparent.

Figure 9:
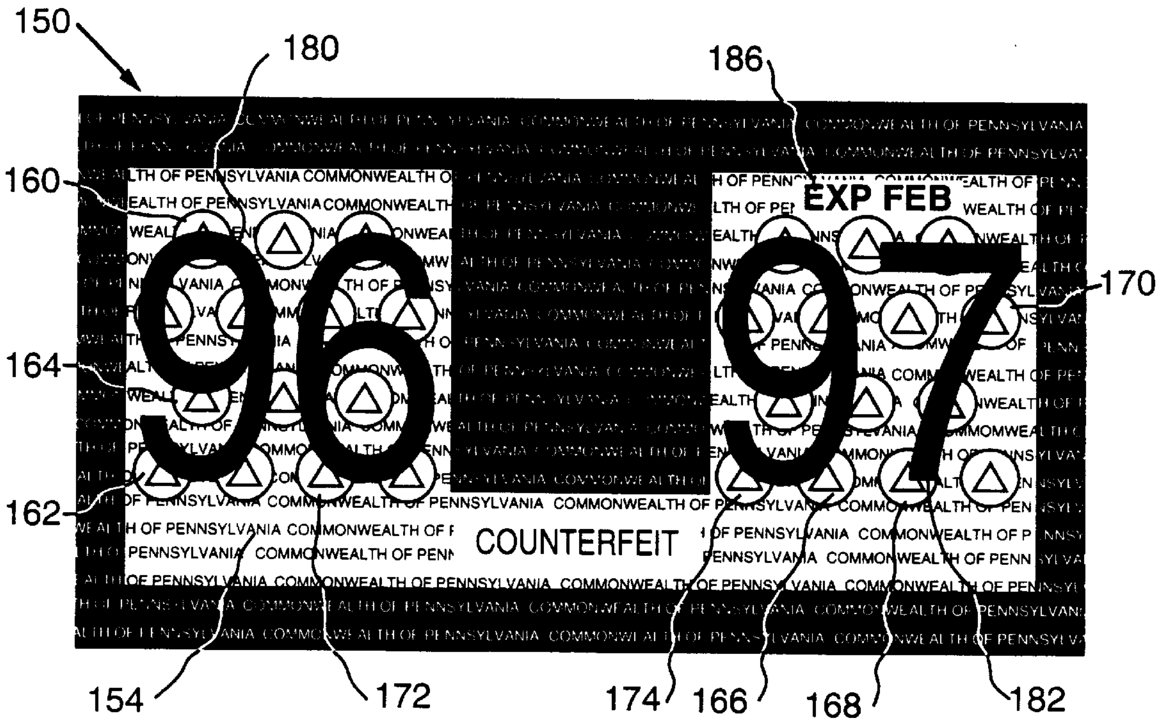
FIG. 9 illustrates a tab of the present invention of the type employable on the inside of a vehicle window.
Figure 10:
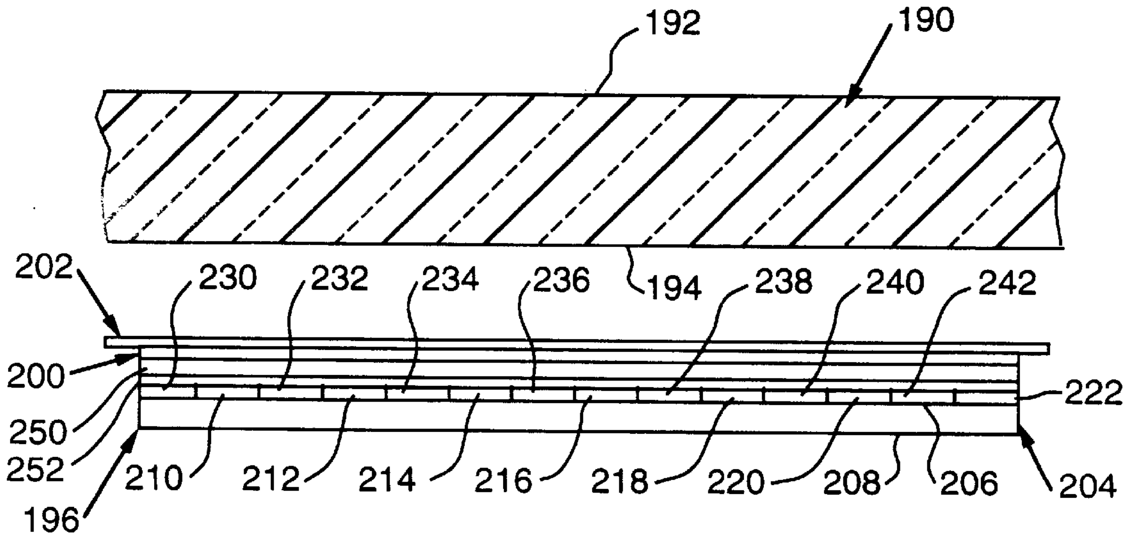
FIG. 10 is a partially exploded, partially in section end view of the tab of FIG. 9.

Referring to FIGS. 9 and 10, a further embodiment of a tamper resistant vehicular validation tab of the present invention will be considered. In this embodiment the tab is adapted to be secured to an inner window surface of the vehicle and viewed through the window. In the specific form illustrated, the tab is an example of a decal confirming state inspection of the vehicle (the word "COUNTERFEIT" has been placed on FIG. 9 in order to minimize the similarity between the drawing and an actual authorized state tab). The tab 150 has a repeated pattern 154 which reads "Commonwealth of Pennsylvania" in order to minimize the risk of counterfeiting. The numbers "96" and "97" which are identified respectively by reference numbers 180, 182 indicate the term during which the validation tab will be valid. The expression "EXP FEB" indicates the month in which the tab will expire. As this pattern does not preclude photocopying or other duplication of the tab, the present invention provides an additional tab feature which will resist duplication and in the example shown includes a plurality of holograms which underlie year dates "96" and "97" (180, 186). In the form shown, the holograms 160–174 (even numbers only) are a plurality of circles containing a triangle therein which are shown in part by the reference numbers 160–174 (even numbers only). These holograms 160–174 will resist duplication of tab 150, as by photocopying or other means of duplication.

As the tab of this embodiment does not have an exposed upper surface when it is secured to a window there is no need to provide a write-resistant material on the upper surface. If desired, in instances where the lower surface is provided with information which is not to be altered, a write-resistant coating may be employed thereon.

Referring to FIG. 10 more specifically, there is shown a portion of a vehicle window 190 which has an outer surface 192 and an inner surface 194 to which the tab 196 will be secured. The tab is similar to other embodiments of the present invention but is inverted in view of the fact that it is the upper surface that will be secured to the window as distinguished from the lower surface being secured to a vehicle substrate. A layer of adhesive means 200, which is preferably a pressure sensitive adhesive of the type disclosed hereinbefore, is provided. This adhesive may be an acrylic-containing material which has an ultraviolet ray resisting component. This component serves to resist damage to the exposed surface of the identifying means as a result of exposure to the actinic rays of the sun. A suitable material for this purpose is that sold under the trade designation Tinovin-P by ICI. Overlying the adhesive means 200 is a strippable liner 202 which for convenience of removal has a greater extent than the adhesive means. When it is desired to secure the tab to the interior window surface 194, the liner 202 is removed thereby exposing the pressure sensitive adhesive layer 200. The pressure sensitive adhesive layer 200 is preferably transparent so as to permit ready viewing of the identifying means. A lower film layer 204, which may for example be made of a suitable polyester, has an upper surface 206 and a lower surface 208. The upper surface 206 of the film layer is provided with portions which are adhesive enhancing such as by tie coat as disclosed hereinbefore. These tie coat portions are represented herein as being sections 210,212,214,216,218,220,222. They alternate with sections which are release materials. The release coating materials are indicated generally in FIG. 10 as bearing reference numbers 230,232,234,236,238,240,242. The respective regions of adhesive enhancing materials (210–222) and release coatings (230–242) may assume a pattern which is shown by way of example in FIG. 4 or may be of any other desired configuration which provides the desired selective bonding. Interposed between the lower surface of adhesive means 200 and upper surface 206 of the film 204 are a layer of identifying means 250 underlying which is a layer of pattern means 252 which resists photocopying of the article. In a preferred embodiment the pattern means 252 will be a hologram, preferably with a metallized surface which faces upwardly.

In a preferred embodiment, the holograms, such as 160–174 (even numbers only) may within layer 252 of FIG. 10 be formed in resin provided with a metallizing layer overlying the same. In creating the hologram, the resin and metallized layer, such as a film or coating, may be deformed downwardly by a force applied to the upper surface. For example, the triangle formed with hologram 172 may be a depression formed by a suitable tool to create a triangular recess in the resin without fracturing the metallized layer overlying the deformed portion. This enhances variations in the pattern of reflected light and thereby increase resistance to counterfeiting by duplication.

As with other embodiments of the invention, an effort to remove the tab from the window will result in partial or total destruction of the identifying means. Any effort to photocopy or otherwise duplicate the tab as by the use of modern scanners through the window will result in the pattern means resisting effective duplication. The relative strength of bond and fragmentation upon separation is preferably the same as in other embodiments of the invention.

It may be desirable for some purposes to provide identifying information such as an automobile VIN number, for example, facing the interior of the vehicle as by providing such information on surface 208. This may be facilitated by placing an opaque coating on surface 208 to permit printing or writing thereon, after which a protective tape may be adhesively secured thereover to resist alteration. As an alternative, a layer of material which may be paper may be adhesively secured to lower surface 208 of film 204 if desired.

It will be appreciated that the tab of the present invention may be delivered and assembled in components. The converter inserts the identifying means in-between tab layers and then securing the assembly thereby creating a unified composite with the identifying means protected within the structure. By facilitating such assembly, the manufacturer or supplier of the components does not have access to completed vehicular validation tabs. This results in increased security through control over the finished tab.

It will be appreciated, therefore, that the present invention provides an efficient, improved means of establishing a tamper resistant vehicular validation tab which is easy to produce and use. It eliminates the need to use glass beads and opaque tabs. All of this is accomplished in a manner consistent with present consumer use and mode of application of vehicular validation tabs. The tab system also provides the opportunity for enhanced security through the encapsulation of the identifying means between the outer film and the adhesive, the use of both segmented surfaces having portions of tie coat and portions of release coatings, as well as a potential for the use of holograms. The selective securement of portions of the identifying means so as to effect fragmentation when the tab is removed and stretching of the outer film and/or adhesive further contribute to achieving the desired objectives. The transparent nature of the tab facilitates resistance to stacking of successive tabs at a specific location.

Words of orientation, such as "upper," "outer," "lower," "inner" and the like are for convenience of reference only and not limitations on the invention unless clearly indicated to the contrary.

Whereas particular embodiments of the invention have been described above for purposes of illustration, it will be evident to those skilled in the art that numerous variations of the details may be made without departing from the invention as defined in the appended claims.

I claim:

1. A vehicular validation window tab comprising adhesive means for securing said window tab to an interior window surface, a lower film having an upper surface and a lower surface, said lower film upper surface having release coating means secured to some but not all portions thereof, identifying means interposed between said lower film and said adhesive means, whereby separation of said lower film from said adhesive means will result in alteration of portions of said identifying means, adhesive enhancing means secured to said lower film upper surface in portions not having said release coating means secured thereto, and said lower film upper surface portions having said adhesive enhancing means having a stronger bond to said adhesive means than the bond between portions of said upper surface having release coating means and said adhesive means, whereby forces applied to said lower film will cause portions of said identifying means secured to said adhesive enhancing means to be removed with said lower film and portions of said identifying means secured to said release coating means to be secured to said adhesive means.

2. The vehicular validation window tab of claim 1 wherein said window tab is a government issued tab.

3. The vehicular validation window tab of claim 1 including the bond between said adhesive means and said window surface being adapted to be (a) stronger than the bond between said release coated portions and said adhesive means and (b) weaker than the bond between said adhesive enhancing means and said adhesive means.

4. The vehicular validation window tab of claim 1 including said identifying means being printed on said adhesive enhancing means and said release means.

5. The vehicular validation window tab of claim 1 including pattern means disposed in underlying position with respect to said identifying means for resisting duplication of said tab.

6. The vehicular validation window tab of claim 5 including said pattern means including hologram means.

7. The vehicular validation window tab of claim 5 including ultraviolet ray resisting means disposed within said adhesive means.

8. The vehicular validation window tab of claim 1 including said lower surface of said lower film having an area for insertion of information.

9. The vehicular validation window tab of claim 1 including said lower film upper surface having about 30 to 60 percent occupied by said adhesive enhancing means and about 40 to 70 percent occupied by said release coating means.

10. The vehicular validation window tab of claim 1 including said adhesive means being substantially transparent to permit viewing of said identifying means.

11. The vehicular validation window tab of claim 1 including said release coating means being a material selected from the group consisting of silicone, polyurethane and polytetrafluoroethylene.

12. The vehicular validation window tab of claim 1 including said adhesive means having an upper surface and a lower surface and the upper surface being a pressure-sensitive adhesive, and removable liner means secured to said adhesive means upper surface.

13. The vehicular validation window tab of claim 1 including said identifying means being established at least in part by printing or image transferring hot stamping.

14. A vehicular validation window tab assembly comprising a lower film having an upper surface and a lower surface, said upper surface having adhesive enhancing means secured thereto in some but not all portions thereof, a layer of adhesive means for securing said vehicular validation window tab to an interior window surface, identifying means interposed between said lower film and said adhesive means, whereby separation of said lower film from said adhesive means will result in separation and removal of portions of said identifying means by said adhesive enhancing means and said adhesive means, and said adhesive enhancing means creating a stronger bond to said adhesive means than the bond between said adhesive means and said window surface.

15. The vehicular validation window tab of claim 14 including release coating means disposed on the upper surface of said lower film in portions not occupied by said adhesive enhancing means.

16. The vehicular validation window tab of claim 14 including said lower film upper surface having about 30 to 60 percent occupied by said adhesive enhancing means and about 40 to 70 percent occupied by said release coating means.

17. The vehicular validation window tab of claim 14 including said adhesive means being substantially transparent.

18. The vehicular validation window tab of claim 15 including said release coating means being a material selected from the group consisting of silicones, polyurethane and polytetrafluoroethylene.

19. The vehicular validation window tab of claim 14 including hologram means disposed in underlying relationship with respect to said identifying means.

20. The vehicular validation window tab of claim 14 including said adhesive means having a pressure-sensitive adhesive, and an ultraviolet ray resisting material disposed within said adhesive means.

21. The vehicular validation window tab of claim 14 including said adhesive means having an upper surface and a lower surface and the upper surface being a pressure-sensitive adhesive, and removable liner means secured to said adhesive means upper surface.

22. The vehicular validation window tab of claim 14 including additional said identifying means disposed on said lower surface of said lower film.

* * * * *